H. B. CLARKE.
ELECTROCUTING INSECT TRAP.
APPLICATION FILED JULY 17, 1911.
1,076,019.
Patented Oct. 21, 1913.
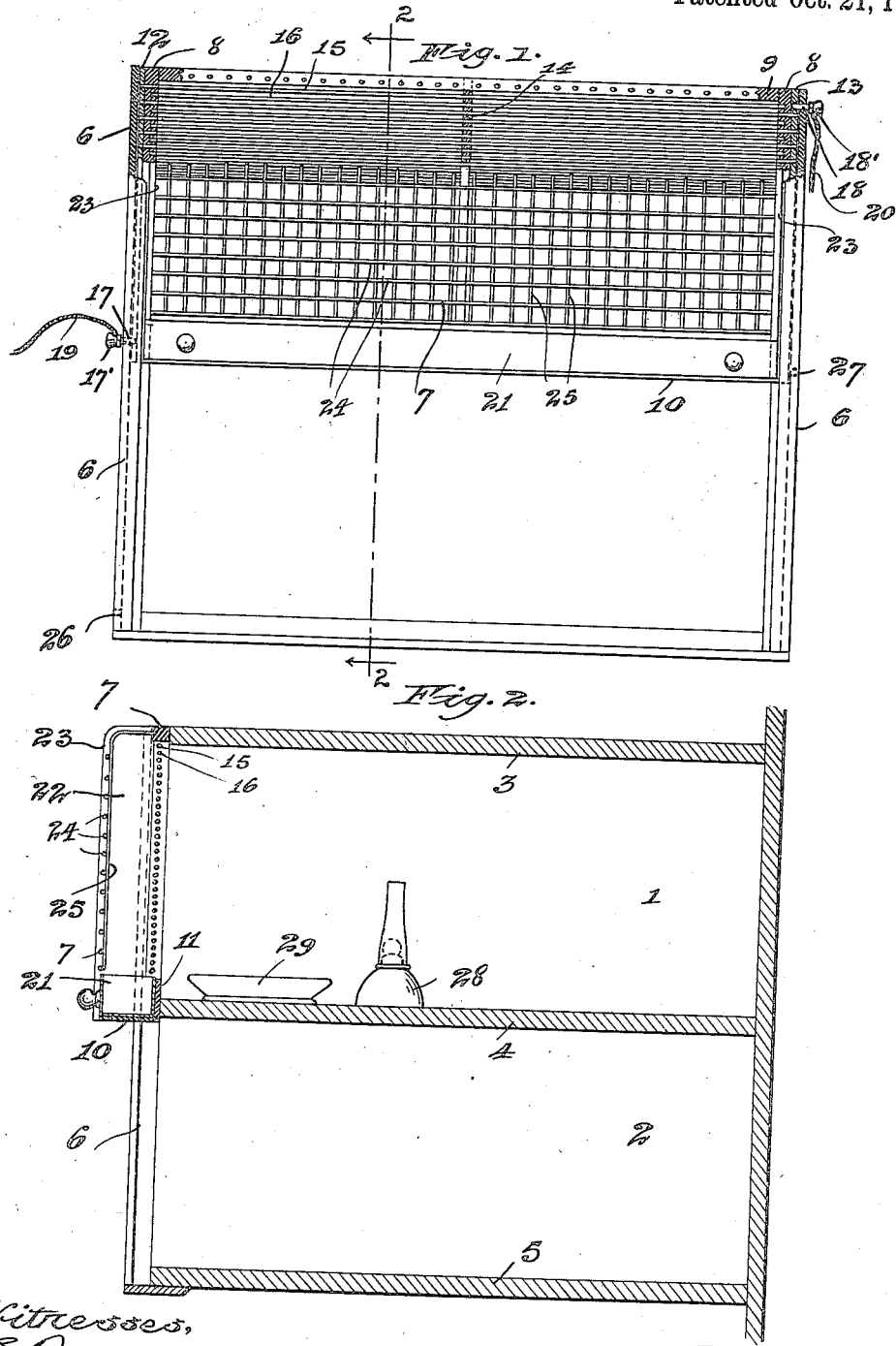

UNITED STATES PATENT OFFICE.

HENRY B. CLARKE, OF HIGHLAND PARK, ILLINOIS.

ELECTROCUTING INSECT-TRAP.

1,076,019.    Specification of Letters Patent.    Patented Oct. 21, 1913.

Application filed July 17, 1911. Serial No. 638,827.

*To all whom it may concern:*

Be it known that I, HENRY B. CLARKE, a citizen of the United States, residing at Highland Park, in the county of Lake and State of Illinois, have invented certain new and useful Improvements in Electrocuting Insect-Traps, of which the following is a specification.

This invention relates to improvements in electrocuting insect traps, and it has for its salient objects to provide a very simple and comparatively inexpensive construction which may be used to serve the double purpose of excluding flies and other insects from any receptacle or closure to which it is applied and at the same time electrocuting those insects which attempt to pass; to provide a construction which may be readily applied to pantry shelves, window openings, provision boxes, etc.; to provide a device which is well safeguarded against accidental injury to persons handling the same; to provide a device which collects the flies and insects electrocuted, and which may be readily cleaned without disturbing the trap proper; and in general, to provide an improved device of the character referred to.

The invention will be readily understood from the following description in conjunction with reference to the drawing, in which—

Figure 1 is a front elevation of a pair of shelves equipped with a preferred embodiment of the invention, certain parts being shown in section; Fig. 2 is a cross sectional view taken approximately on line 2—2 of Fig. 1 and looking in the direction of the arrows.

The principle of operation utilized in securing the electrocution of the insects is in providing a grid or grating of conducting members, alternate ones of which are connected with opposite poles of a source of electric current and so arranging this grid or grating that insects in attempting to pass through or over the same will close the circuit through their bodies and be thereby electrocuted.

Referring to the drawing, 1 and 2 represent compartments open at one side only, as for example a set of pantry shelves, 3, 4 and 5, open as usual at the front. At the front, at each side of the set of shelves, are provided undercut vertical ways 6, 6, and within these ways is arranged to fit and slide a grid-frame, designated as a whole 7. The grid-frame is preferably, and as shown, of such width as to just close the front side of one of the spaces between the shelves, so that it may be shifted up or down opposite either space for the purpose of obtaining ready access to either shelf, and preferably for the purpose of utilizing the grid as a closure for either shelf's space desired.

The frame 7 comprises a completely surrounding frame of insulating material, as hard rubber or red fiber, comprising the end frame members 8, 8, the top frame member 9 and the two bottom frame members 10 and 11 (see Fig. 2), the latter being arranged at right angles to each other for a purpose hereinafter described. On the outside of each of the end frame members 8, 8, is applied a metal conducting strip, as 12, 13. Preferably also one or more intermediate cross connecting frame members 14 of insulating material are provided. In the marginal frame thus provided are mounted two sets of conducting rods or wires, as 15 and 16. The members of these two sets of wires are alternated, one set being connected to one pole of the circuit and the other to the opposite pole. The rods are arranged parallel with each other and slightly spaced apart, the spaces between them being so small as to prevent insects, even insects so small as a small ant, from passing between them without coming into contact with the two rods. In practice I have found about one-sixteenth of an inch a suitable spacing apart, and I prefer to make the rods comparatively heavy and of rather hard metal, so that they cannot be readily bent into contact with each other. The rods of one set, as 15, extend through the insulating end frame member 8 and are fastened into the corresponding metal contact strip, as 12, while the rods of the other set extend only part way through the insulating strip 8 next to the contact strip 12, while at their opposite ends they extend entirely through the insulating strip 8 and into the corresponding strip 13. By this arrangement each alternate rod is connected with a contact strip of opposite polarity yet normally there is no circuit connection between the two. Both sets of rods are arranged in the same plane, as shown clearly in Fig. 2, and both sets extend through the cross frame member or members 14; the latter being simply spacing supports.

To conduct current through the grid-frame, a pair of contact plugs, as 17 and 18, are arranged to extend through the outside way strips 6, 6, and into suitable socket openings in the respective conducting strips 12 and 13. These contact plugs have insulating handles 17' and 18', respectively, flexible covered conductors 19 and 20 connected with the plugs lead to any suitable source of electrical current supply, as for example an ordinary A C lighting circuit. The two lower frame strips 10 and 11 form a convenient seat, upon which is mounted a drawer 21 to receive the electrocuted insects, which upon being shocked fall down the face of the grid into the drawer. The drawer may be drawn out and emptied in an obvious manner.

In order to protect against accidental contact with the grid by persons or animals, a relatively open mesh screen 22 is provided; this desirably taking the form of a shallow box composed of the end frame members 23 and the grid wires 24 and 25. The upper and side edges of the grid frame are secured to the main grid-frame in any suitable manner; the lower part of the screening terminating just above the upper edge of the drawer 21. When access to the top space 1 above the shelf 4 is desired, the plugs 17 and 18 are withdrawn, whereupon the frame is lowered into position opposite the lower space. The withdrawal of the contact block serves both to interrupt the circuit connections and to mechanically release the frame. If desired, the frame can be connected in circuit in its lower position, plug apertures 26 and 27 being provided for this purpose.

Ordinarily when the device is used to protect pantry shelves, the food materials will be a sufficient attraction to cause the insects to try to creep through the grid, and thus be electrocuted. If it is desired to attract moths, flies and other insects, a light may be placed back of the grid, as indicated at 28, or a dish of some aromatic or odorous food, as indicated at 29. It is, of course, obvious that such a grid-frame may be used to cover one side, or an opening of one side, of any desired closure, as for example, a window opening in a room, or an opening in a breadbox or provision box. I do not therefore wish to be understood as limiting myself to the specific details of construction shown, but on the contrary wish the appended claim interpreted broadly, except in so far as it is made specific to details.

I claim as my invention:

In combination, a box-like inclosure open at one side only and an electrocuting grid or screen covering said open side, said electrocuting device comprising a marginal frame mounted in ways to slide across into and out of register with the opening of said box-like inclosure, a series of electrocuting conductors forming a screen extending across said frame, suitable electrical connections for connecting every alternate conducting rod with the opposite pole of a source of electric current of large amplitude, a source of such current, means for detachably securing said electrocuting screen in position, and an openwork guard covering the exterior of said electrocuting screen.

HENRY B. CLARKE.

Witnesses:
L. B. CLARKE,
JOHN R. MURPHY.